United States Patent [19]

Biasillo et al.

[11] Patent Number: 5,010,491

[45] Date of Patent: Apr. 23, 1991

[54] AUTOMATED SYSTEM FOR MACHINING PARTS TO CLOSE TOLERANCES

[75] Inventors: Alberto Biasillo, Maine, N.Y.; Richard C. Taylor, Warren Center, Pa.

[73] Assignee: International Business Machines Corp., Armonk, N.Y.

[21] Appl. No.: 290,588

[22] Filed: Dec. 27, 1988

[51] Int. Cl.$^5$ .................. G06F 15/46; G05B 19/18
[52] U.S. Cl. .................. 364/474.28; 364/474.06; 364/167.01
[58] Field of Search .................. 364/167.01, 474.28, 364/474.31, 474.06, 474.16, 551.02, 561, 563, 571.01, 571.02, 577

[56] References Cited

U.S. PATENT DOCUMENTS

| | | | |
|---|---|---|---|
| 4,031,368 | 6/1977 | Colding et al. | 364/474.15 |
| 4,502,125 | 4/1985 | Toneda et al. | 364/474.36 |
| 4,510,365 | 4/1985 | MacGregor et al. | 219/69.16 |
| 4,533,991 | 8/1985 | Georgis | 364/164 |
| 4,564,910 | 1/1986 | Smith et al. | 364/577 |
| 4,580,368 | 4/1986 | Smith | 51/165.77 |
| 4,584,796 | 4/1986 | Toneda et al. | 51/165.71 |
| 4,663,889 | 5/1987 | Strand et al. | 51/106 R |
| 4,712,332 | 12/1987 | Smith | 51/103 WH |
| 4,855,925 | 8/1989 | Bhateja | 364/474.06 |

*Primary Examiner*—Jerry Smith
*Assistant Examiner*—Jim Trammell
*Attorney, Agent, or Firm*—Hugh D. Jaeger

[57] ABSTRACT

A lapping machine control system which utilizes a electromechanical probe to generate a signal responsive to the separation of the laps, which also represents the thickness of the part being lapped. The separation signal, which is unsuitable for direct control since it is too noisy, is used with a best fit algorithm to estimate the time to reduce the part to the desired thickness, based on the rate of material removal provided by extrapolated line representing the best fit of the lap separation signal. The machining is terminated when the extrapolated line reaches the intercept of time and thickness.

15 Claims, 3 Drawing Sheets

- POINT A — DESIRED THICKNESS OF PART
- POINT B — INTERCEPT OF TIME & THICKNESS — DESIRED TIME OFF

AUTOMATED SYSTEM FOR MACHINING PARTS TO CLOSE TOLERANCES

TECHNICAL FIELD

This invention is directed to a system for automatic control of a mechanical lapping machine utilizing a distance sensor which measures the position of the lapping tool relative to a reference surface and digital computer which generates a best fit curve from the distance measurements, calculates the time estimated to reach the desired measurement, and terminates the lapping operation when the estimated time is reached.

In particular, the invention relates to a computer control system for a lapping machine utilizing a linear variable differential transformer to measure the separation between the laps, and a computing system to fit the measured values to a smoothed curve representing the measurements as a function of time. The system terminates the lapping operation at the point in time where the smoothed curve intersects the desired thickness of the machined part.

BACKGROUND ART

Machine tools of different types have long been operated under both open and closed loop computer control. In an open loop system, the position of the cutting surface of the machine tools is calibrated and then the tool is operated to advance the cutting tool the prescribed distance or depth to perform the desired operation. Open loop systems are more common in drilling and cutting operations such as performed by punch presses, jig borers, drill presses, lathes and milling machines.

Grinding operations are sometimes performed under closed loop control since the position of the abrasive wheel may not provide an accurate measurement of the part being machined. That is, the grinding operation is controlled by measurements taken directly from the part rather than relying on the position of the grinding wheel itself. For example, the system described in U.S. Pat. No. 3,655,652 uses a linear variable differential transformer to accurately measure the workpiece. The output of the linear variable differential transformer is digitized and used to derive an indication of the amount of material removed from the workpiece, the rate of removal of the material from the workpiece, and the degree of out-of-round of the workpiece. The system of the patent does not develop a signal by means of curve fitting techniques nor does it extrapolate to determine the point in time when the desired amount of material has been removed.

The gear tooth grinding system described in U.S. Pat. No. 3,906,677 provides for modification of the cam control by signals stored in a computer. The system avoids sudden, and therefore, large feed movements by interpolating the command and dividing it into a series of smaller increments. There is no direct measurement from the gear tooth being ground and the system does not involve extrapolation to determine when the grinding operation is complete.

In U.S. Pat. No. 4,027,245, the described control system does not utilize extrapolation nor are direct measurements made from the workpiece to determine the rate of material removal. The grinding wheel position is under direct control of the program which responds to the angular position of the workpiece, but without regard for the dimensional change of the workpiece. A position transducer is utilized only for the purpose of the serve system control and lies outside the computer loop.

U.S. Pat. No. 4,502,125 describes a numerical controller for an angular slide grinding machine which accommodates the change in diameter of the grinding wheel in a dressing operation. The described system does not apply curve fitting techniques to the transducer signal nor does it extrapolate to determine the point in time when the desired amount of material has been removed.

The grinder control system shown in U.S. Pat. No. 4,570,385 is designed to operate in a teach mode, wherein manual control movements are recorded by the computer, and an operate mode in which the previously entered and recorded control movements are reexecuted by the system to duplicate the original movements. The system does not apply curve fitting techniques nor does it extrapolate to determine the point in time when the desired amount of material has been removed.

The system shown in U.S. Pat. No. 4,584,796 is directed to a grinding machine which has a dressing tool fixedly mounted to the bed of the machine and a control system which accommodates both the wear on the grinding wheel caused by the dressing tool and the wear on the dressing tool caused by the dressing operation. The system includes registers which may be manually loaded in the situation where a new grinding wheel is used. The system of the patent does not include means for measuring changes to the workpiece and relies on the measurement of the grinding wheel itself. There is no disclosure of curve fitting or extrapolation to determine when the machining operation has removed the desired amount of material.

The system described in U.S. Pat. No. 4,546,573 utilizes optical detectors in conjunction with reference lines to accurately position the workpiece for a grinding operation. The control system does not apply curve fitting techniques nor does it employ extrapolation to determine when the grinding operation should be terminated.

U.S. Pat. No. 4,233,784 addresses the problem of uneven grinding wheel wear in an apparatus for edge grinding lenses. When lenses are edge ground at the same point of the grinding wheel, the resulting wear causes the formation of a groove in the wheel. To prevent this, a sensor is moved over the surface of the wheel to detect the high point of any irregularity and subsequent grinding takes place at the high point, tending to restore the surface to a flat profile. This system does not utilize curve fitting nor does it employ extrapolation to determine the point in time when the grinding operation should be terminated.

An article in the *IBM Technical Disclosure Bulletin*, Vol. 1P, No. 1, June 1969, pp 152–55, described a numerical control system which compensates for the dimensional inaccuracy of the cutting tool. The control program provides a linear compensation formula and a circular arc compensation formula. The system does not apply curve fitting techniques to measured values nor does it extrapolate to determine the point in time when the grinding should be terminated.

The control system described in the U.K. Patent No. 2,108,024 provides for additional material to be removed from the workpiece if the stored control program has been completed and the gauge responsive to the dimension of the workpiece indicates that the proper size has not yet been achieved. There is no teaching of curve fitting nor is there any suggestion that the machining operation be terminated in accordance with a value determined by extrapolation from the rate of material removal.

In the control system of French Patent 2,478,515, the grinding machine is controlled to remove a specific volume of material in a unit time. The abstract contains no reference to curve fitting, nor extrapolation as a means for determining when the grinding operation is completed.

The abstract of Russian Patent 1,278,181 describes a system for detecting the point where the cutting tool on a lathe first touches the workpiece. The resulting vibrations are transmitted to a sensor which initiates the automated program for control of the cutting tool. The abstract does not mention the use of curve fitting nor the application of extrapolation techniques to determine the point in time when the turning operation is completed.

While the described turning and grinding systems are in some respects similar to the removal of material by the lapping process, there are certain significant differences which make it difficult to successfully apply the same control techniques. For example, the location of the workpiece between the fixed and movable laps makes it difficult to obtain a direct measurement of the workpiece. Additionally, the nature of the process makes the secondary measurements, those obtained from the lap, very noisy. That is, there is no assurance that any one measurement, or even a series of measurements, is an accurate representation of the workpiece dimension. Since the measurements differ from the actual dimension in random fashion, termination of the lapping operation in response to the first sensing of the desired dimension will virtually ensure an oversize part. If the lapping operation is continued until the average of the sensed dimension is at the desired dimension, there is the likelihood that the lapping operation will have proceeded too long a time and the finished part will be undersized.

DISCLOSURE OF THE INVENTION

It is therefore an object of this invention to provide a machine control system which is adapted for use in a closed loop system having transducers which provide noisy output signals.

It is another object of this invention to provide a closed loop control system for a machine tool in which the signal from the transducers, which sense the workpiece, is fitted to a curve which is then used to extrapolate and predict the time for completion of the machining operation.

It is a still further object of the invention to provide a machine tool control system which applies curve fitting techniques to the transducer signals and utilizes an extrapolation of the resulting curve to predict the time of completion of the machining operation.

Still another object of the invention is to provide a closed loop control system for a lapping machine in which the transducer signals are used to derive a best fit to a curve representing the workpiece thickness as a function of time, and the resulting curve is extrapolated to predict the time of completion of the lapping operation to the desired thickness.

These and other objects of this invention are accomplished by a computer based control system for a lapping machine having position sensitive transducers for developing output signals representative of the distance between first and second lapping surfaces, the computer being adapted to fit the output signals to a curve representing the progress of the machining operation in terms of distance and time and from the resulting curve, performing an extrapolation to predict the point in time at which the machining operation will have progressed to the desired end point, leaving the workpiece at the desired thickness.

DESCRIPTION OF THE INVENTION

Figure 1:
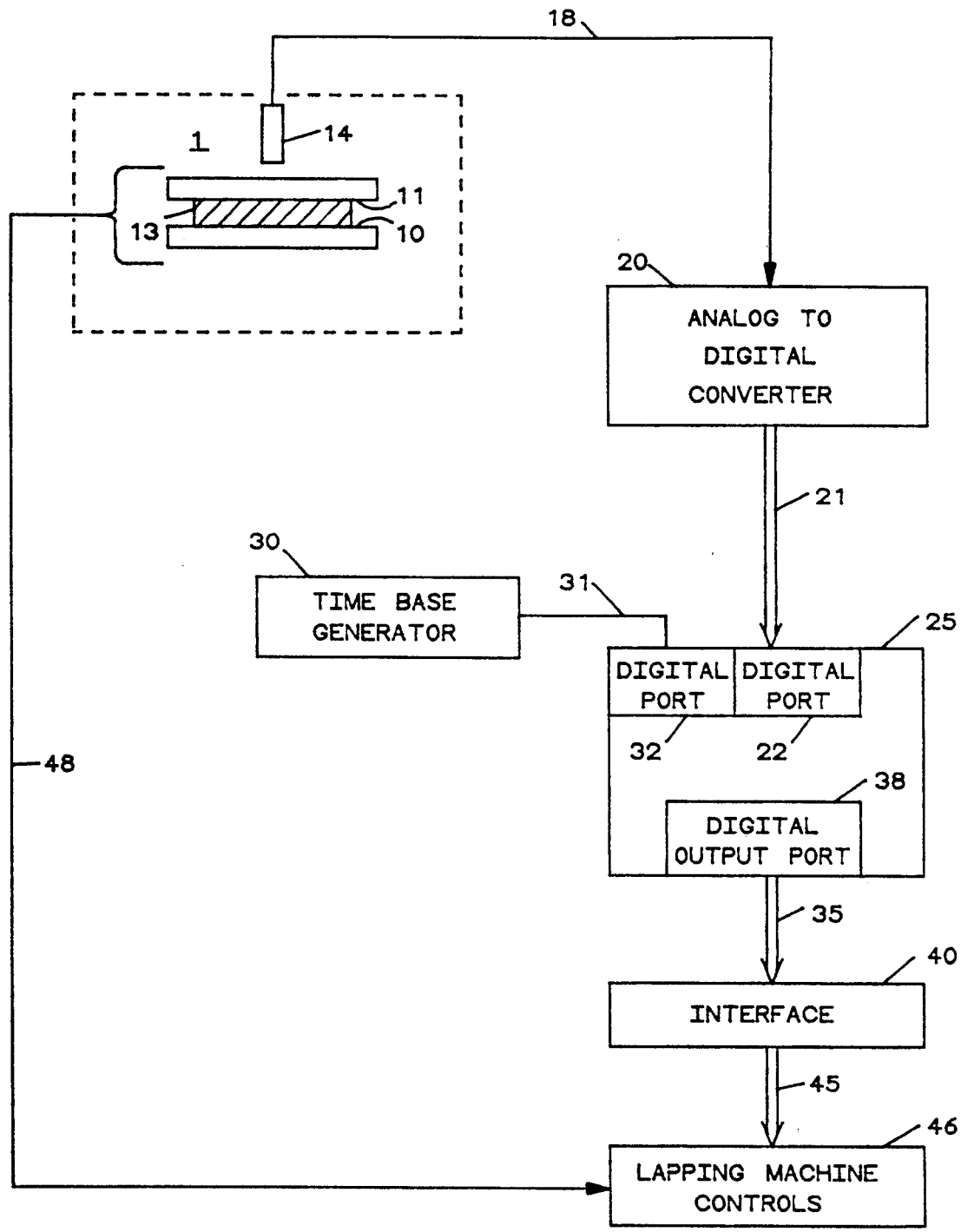
FIG. 1 is an illustration of the system architecture of the invention.

With reference to the system architecture shown in FIG. 1, a conventional lapping machine 1 such as Model PR-1, manufactured by P. R. Hoffman Co., includes a first machinery surface 10 and a second machinery surface 11, between which lies the workpiece 13, the part to be machined to a desired thickness. One or both of the surfaces 10 and 11 of lapping machine 1 may be driven by suitable drive means, not shown. A linear variable differential transformer 14 of the type described in U.S. Pat. No. 3,665,652 is mounted on the lapping machine 1 in a position to accommodate measurement of the distance to the surface 10 and 11, thereby making it possible to derive a measurement of the distance separating the surfaces 10 and 11, which is also a measure of the thickness of the workpiece 13 being lapped.

The analog output signal from the linear variable differential transformer (LVDT) 14 on cable 18 is fed to the input of analog to digital converter 20, which converts the analog voltage on cable 18 to a port 22 of the control computer 25. The preferred form of control computer 25 is the well known personal computer such as the IBM Model XT. In the event that the control computer 25 does not include a real time clock, a suitable source of timing pulses may be supplied by time base generator 30 over bus 31 to the digital input port 32 of control computer 25. The frequency of the timing pulses, or the time separation, is selected to accommodate the anticipated lapping rate. The time separation, or interval, between readings is also dependent on the time constant of the linear variable differential transformer. Preferable, the interval will be longer than the time constant of the linear variable differential transformer to provide truly random readings which are relatively independent of the time constant. Readings taken at too short an interval will increase the noise content of the signal and be biased by the LVDT time constant. In the preferred embodiment, the time base generator supplies digital pulses at a rate of 1 pulse per second.

The control computer 25 stores the digital input signals from the LVDT and performs a curve fitting operation to develop a curve which represents the displacement of the lapping surface 10 from the lapping surface 11 as a function of time. As will be later described, the control computer extrapolates this curve to determine the point in time when the desired thickness of the workpiece 13 will be reached. When this time is reached, the control computer 25 develops an output signal on the output bus 35 from digital output port 38 of control computer 25.

The output signal on bus 35, representing a control action to be taken on the lapping machine 1, is applied to the lapping machine interface 40, which in turn develops appropriate control signals on bus 45 to effect the appropriate adjustment of lapping machine controls 46 to operate lapping machine 1 through appropriate mechanical, electrical or hydraulic means shown generally as line 48. For any given lapping operation, the machine operates at a single pre-selected speed. A different pre-selected speed may be used for a different application (i.e., type of material, hardness, etc.).

Figure 2:
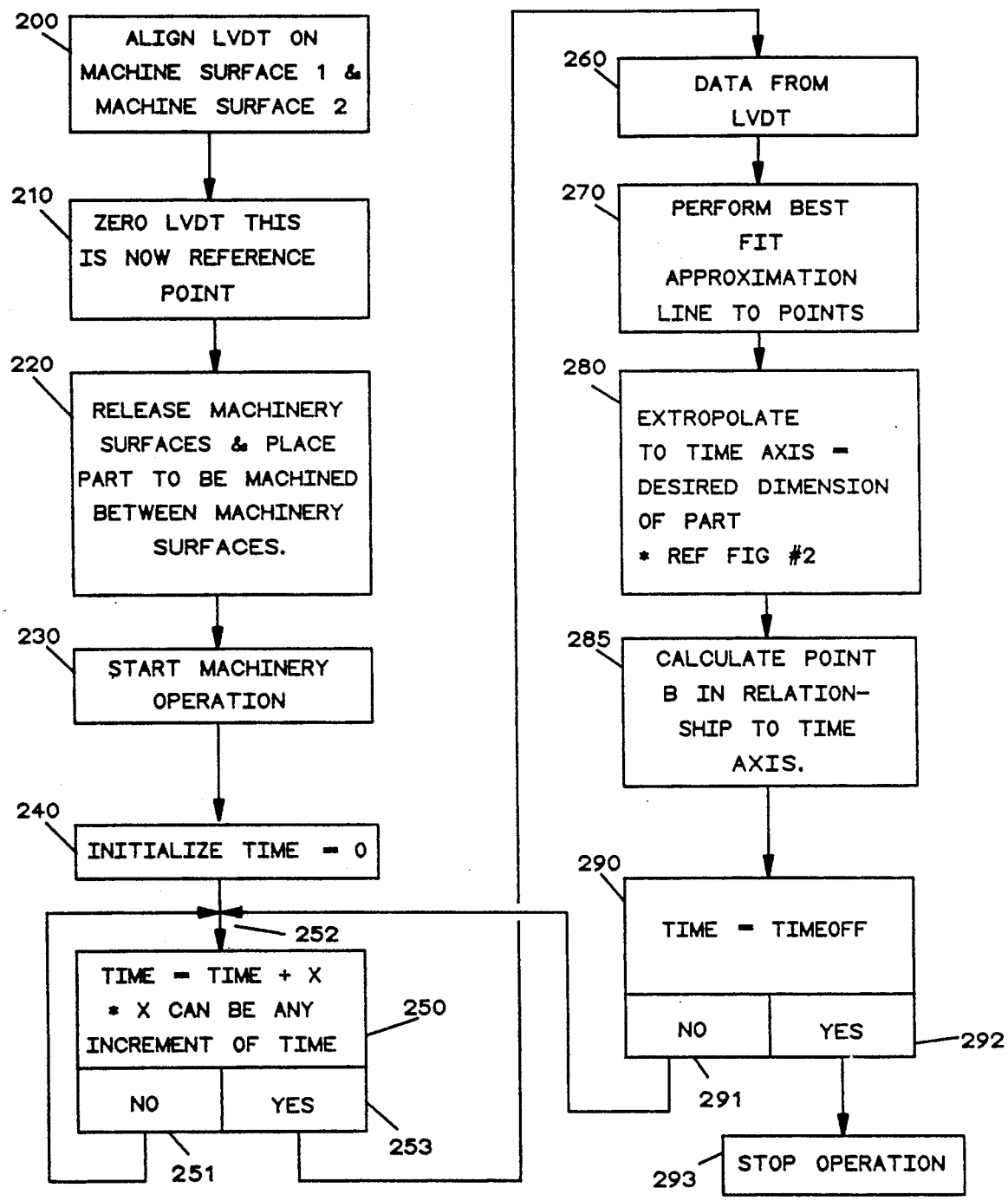
FIG. 2 is a data flow chart of the control algorithm used in the system of the invention.

The algorithm used in the control computer 25 to handle the LVDT 14 input signals and develop the appropriate output signals to the machine interface 40 is set forth in FIG. 2. The control algorithm begins with the calibration of the LVDT in block 200. The surfaces 10 and 11 are first cleaned and the LVDT is aligned to register the distance to each. The digital values are then recorded in the memory unit of the control computer 25 to provide a calibration of the LVDT as shown in the block 210.

After the LVDT has been properly positioned and calibrated, the lapping machine can be released for the lapping operation. The workpiece 13 is placed between the surfaces 10 and 11 and the lapping machine 1 is prepared for the machining operation as shown in block 220.

The machining operation is begun in block 230. This is effected by signals sent from the control computer 2 through the interface 40 to the lapping machine controls 46. At this point, the control computer 25 initializes a register containing the real time to a zero value as shown in block 240. During the control operation, this register will be continuously updated by the timing pulses generated by the time base generator 30.

The control algorithm then proceeds to the block 250 which serves to determine the interval at which the LVDT signal is read and stored in the control computer 25. The intervals between successive readings is characterized as the value X, which, in the preferred embodiment, is set to equal 1 second by way of example and for purposes of illustration only and not to be construed as limiting of the present invention. This value is set to produce a number of readings during the lapping period to provide a statistically meaningful population. In the event that the time interval has not yet reached the value X, the control algorithm branches from the NO output 251 back to the input 251 of block 250. This loop is repeated until the time X has passed and the breach is from the YES output 253 to the input of block 260.

When sufficient time has passed since the last reading, that is, the time specified as X has elapsed, block 260 operated to read the current value of the signal being continuously developed by the LVDT 14. After the LVDT value is read and stored in the memory of control computer 25, the control program operates to fit a curve to the values using a conventional best fit approximation technique such as that described in SAS manuals or basic calcular books, as shown in block 270.

The resulting straight line approximation represents the thickness of the workpiece as a function of time. The slope of the line represents the rate of material removal. If the parameters of the lapping machine 1 are not changed during the lapping operation, the rate of removal remains essentially constant. That being the case, the line representing the best fit approximation may be extrapolated forward in time to project the workpiece thickness at a given, future, time. The extrapolation process is carried out in block 280.

Since the thickness at a future point in time can be determined by reference to the extrapolated line, it is also possible to determine the point in time where a given thickness will be reached. This point is determined in block 285. Knowing the initial thickness and having determined the rate at which the material is being removed, it is possible to determine the point in time where the workpiece will reach the desired thickness. It will be appreciated that the calculated time will vary somewhat as more and more readings are taken and the curve fitting process proceeds. The first few readings are insufficient to make an accurate prediction of the end point in time, and it may be desirable to insert a subroutine in the algorithm that inhibits a prediction of the end point until a certain minimum number of LVDT readings have been made, the values recorded in memory and the resulting curve derived.

After the curve has been updated as a result of the most recent reading and the projected time of completion is calculated, a test is made to see if the projected time has been reached. This test is performed in block 290. If the projected time has not yet been reached, it means that the workpiece is still oversize and the lapping operation is to be continued. In this event, the branch from block 290 occurs from the NO output 291 and returns the control program to the input of block 250, where the program loops until the time for the next LVDT reading arrives. If, on the other hand, the time projected for the completion of the lapping operation has been reached, the branch at block 290 occurs from the YES output 292 and the STOP OPERATION block 293 is activated to terminate the lapping operation.

While the timing functions which determine the interval at which the LVDT signal is read and stored in control computer 25 are flexible and determined largely by process parameters such as the rate of material removal and the time constant of the LVDT, the time value for X must be such that the computer operations included in blocks 260 through 290 can always be completed before the time for the next reading of the LVDT is reached. This is not usually a problem since the control computers perform the calculations quite rapidly.

Figure 3:
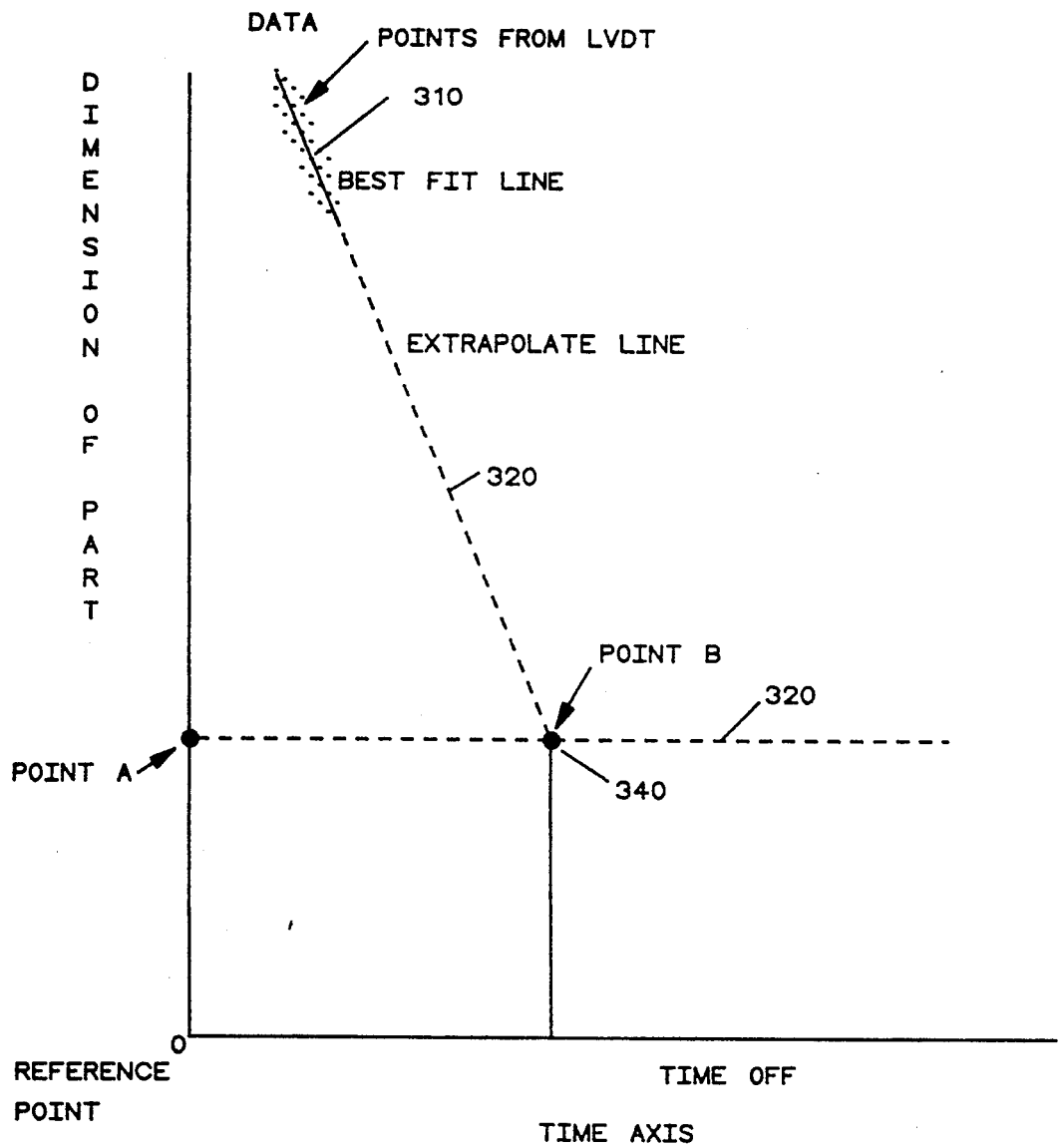
FIG. 3 is a portrayal of the curve fitting and extrapolation used in the invention.

FIG. 3 illustrates the curve fitting technique and the fashion in which the end point of the lapping operation is predicted and determined. The vertical axis represents the thickness of the workpiece as determined with respect to a reference point at the origin. The purpose of the lapping operation is to reduce the thickness of the part to a value represented by point A. The initial readings from the LVDT will be in the range shown generally as "Points from LVDT" in the drawing. These readings will be dispersed on either side of the best fit line in statistical fashion. The deviation is the result of noise associated with the movement of the lapping surface 10 and 11 as well as noise generated within the LVDT itself.

As previously described, the control algorithm develops a best fit line, shown as the solid portion 310. This line is then extrapolated as shown by the dashed portion 320 of the line. The intersection 330 of dashed line 320 and the line 340 representing the desired ultimate thickness is the point in time where the lapping machine is turned off.

What is claimed is:

1. A lapping machine control system comprising:
   a. means for measuring the relative positions of first and second laps to develop analog signals representing the instantaneous distance between said laps;
   b. analog to digital converter means for converting said analog signals to digital form;
   c. control computer means for reading said digital signals as periodic intervals;
   d. curve fitting means in said computer means for developing a curve representing the separation of said laps as a function of time;
   e. extrapolation mans in said computer means for predicting the point in time when the separation of said laps will reach a desired value; and,
   f. means coupled to said extrapolation means for changing mode of said lapping machine when said point in time is reached.

2. A system according to claim 1 wherein control computer means includes time base generator means for developing a periodic clock signal which initiates a reading and storage of the digital signal from said analog to digital converter.

3. A system according to claim 2 wherein said curve fitting means comprises a computer program having a best fit approximation.

4. A system according to claim 1 wherein said curve fitting means in said computer comprises a best fit approximation.

5. A system according to claim 2 wherein the interval between successive periodic clock signals is selected to provide sufficient stored digital signals to allow extrapolation of the curve representing the distance between said laps as a function of time.

6. A system according to claim 5 wherein said extrapolation is performed after each digital reading.

7. A system according to claim 5 wherein said extrapolation is performed after a predetermined number of digital readings.

8. A system according to claim 5 wherein said extrapolated curve is used to calculate the time at which the distance between said laps will be a predetermined value.

9. A system according to claim 8 having means for signalling a lapping machine to terminate a lapping operation when the calculated time for completion is reached.

10. A system according to claim wherein said means for measuring the relative positions of first and second laps includes a linear variable differential transformer.

11. A method of operating a lapping machine comprising the steps of:
    a. making periodic measurements of the distance between the laps with an analog measuring device;
    b. converting said analog measurements to signals in digital form;
    c. storing said digital signals;
    d. fitting said stored digital signals to a curve representing the distance between laps as a function of time;
    e. extrapolating said curve to predict the time when the distance between said curve will reach a predetermined value;
    f. measuring the time to determine when the predicted time is reached; and,
    g. signalling a termination of the lapping operation when the predicted time is reached.

12. A system according to claim 11 wherein step c through g are performed by a general purpose digital computer.

13. A system according to claim 12 wherein said digital computer is a personal computer.

14. A system according to claim 13 wherein the measurements of step a are made with a linear variable differential transformer.

15. A system according to claim 14 in which the interval between stored digital signals is greater than the time constant of the linear variable differential transformer.

* * * * *